April 20, 1937.　　G. A. FOISY　　2,077,383
TESTING APPARATUS
Original Filed Sept. 2, 1932
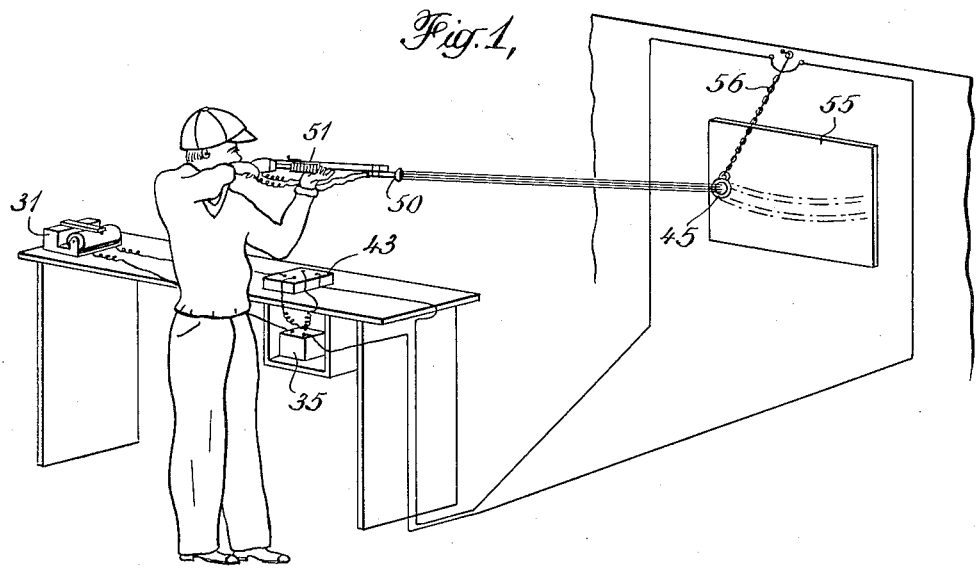
Fig. 1,
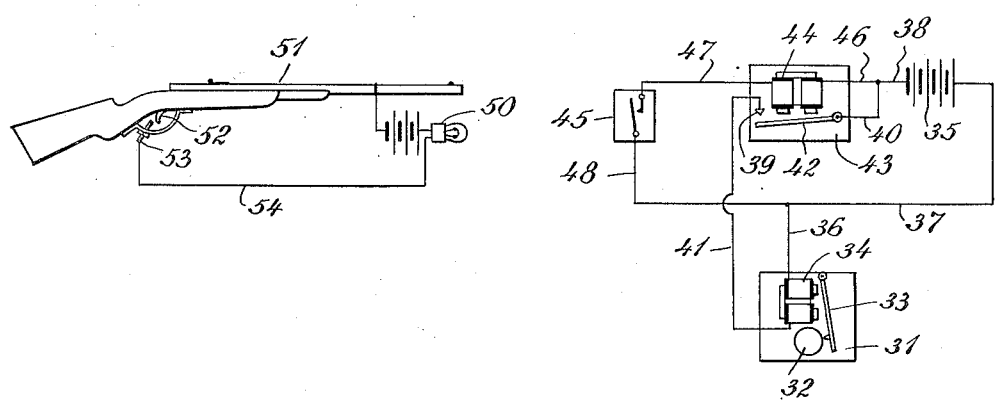
Fig. 2,
INVENTOR
George A. Foisy.
BY
Pennie, Davis, Marvin & Edmonds
ATTORNEYS

UNITED STATES PATENT OFFICE

2,077,383

TESTING APPARATUS

George A. Foisy, New Haven, Conn., assignor to Winchester Repeating Arms Company, New Haven, Conn., a corporation of Maryland Original application September 2, 1932, Serial No. 631,464. Divided and this application February 24, 1936, Serial No. 65,199

5 Claims. (Cl. 35—25)

This invention relates to the testing of human reactions and has for an object the provision of novel testing apparatus which may be employed for scientific or educational purposes or for commercial purposes, as, for example, in the amusement field or in the advertising field. This application is a division of my copending application, Serial No. 631,464 filed September 2, 1932.

The apparatus of the invention is designed to test the coordination of the eye and muscles and to measure the speed or rapidity of response and control of a subject.

The apparatus of the invention comprises a light source, a recording device, a light-sensitive cell responsive to light from the light source, a source of electric current and electrical conductors so arranged that operation of the recording device is controlled through the action of light from the light source on the light-sensitive cell. The light source and the light-sensitive cell are movable relatively to one another; both may be movable or one may be movable and the other fixed. The arrangement of the light source may be such that a beam of direct light or a beam of reflected light is obtained. The source of the beam of light or the light-sensitive cell is so mounted that a subject to be tested must direct the beam of light on the light-sensitive cell. The recording apparatus may be of any suitable type and the end of the recording period may be indicated in any suitable manner. Thus, for example, the recording device may be of the type whose operation could be stopped completely to indicate the end of the recording period, or the recording device may be of the continuously operating type in which the end of the recording period is indicated by a mark made by a controllable element of the device.

The invention will be better understood from a consideration of the following description in conjunction with the accompanying drawing in which:

Fig. 1 is a perspective view of an apparatus of the invention illustrating its method of use; and Fig. 2 is a diagrammatic view of the electric circuit arrangements.

The apparatus shown in Figs. 1 and 2 of the drawing comprises a recording device 31 of the well known drum type provided with a rotating cylinder 32 for the reception of a sheet of recording paper and a movable pencil 33. The pencil 33 forms the movable element of a relay comprising an electromagnet 34 which is electrically connected to a source of electric current 35 by means of conductors 36, 37, 38, 40 and 41 through the movable element 42 of a photoelectric relay 43. The movable element 42 is so mounted as to engage a contact element 39 connected to the conductor 41 to complete the circuit including the electromagnet 34. The electromagnet 44 of the photoelectric relay 43 is electrically connected in circuit with a photoelectric cell 45 and the source of supply of current 35 by means of conductors 38, 46, 47 and 48.

A flashlight 50 is mounted on and grounded to the barrel of a gun 51. The trigger 52 of the gun forms the movable element of the control switch for the flashlight. A screw 53 mounted on the trigger guard with one end lying in the path of travel of the trigger and its other end electrically connected with the flashlight by means of a conductor 54 forms the stationary contact of the flashlight control switch. The screw 53 and the trigger guard are suitably insulated from the gun barrel.

The photoelectric cell 45 is pivotally mounted on a rigid rod 56 for oscillating movement in front of a screen 55 which may be of any suitable material.

In using the apparatus illustrated in Figs. 1 and 2, the photoelectric cell is caused to swing across the screen from a position at one side of the screen, and the subject endeavors to draw a bead on the oscillating photoelectric cell which is in circuit with the pencil of the drum recorder. At the instant the photoelectric cell becomes visible in front of the screen, or alternatively at the instant the cell starts to swing, the pencil 33, if in contact with the cylinder 32 would indicate zero on a suitable scale or chart on the cylinder. At that time, the subject raises the gun to a firing position and attempts to draw a bead on the moving photoelectric cell. When the subject believes that he has succeeded in drawing a bead on the photoelectric cell, he pulls the trigger 52 into contact with the stationary contact element 53, completing the flashlight circuit and causing a beam of light to travel in the direction of the photoelectric cell. If the aim of the subject has been accurate, the beam of light will strike the photoelectric cell causing the circuit in which it is included to be completed and causing the movable element 42 of the photoelectric relay to move into contact with the contact element 39. The electromagnet 34 will thus become energized and the pencil 33 will be moved into contact with the surface of the cylinder 32 and make a mark on the scale or chart mounted thereon. The recording operation will thus be completed, and the distance between the zero mark and the pencil mark on the scale or chart will be a measure of the subject's speed of reaction, that is, a measure of the time required for him to draw a bead on the target and pull the trigger.

Any suitable type of recording, timing or counting device may be substituted for the drum type recorder, and any suitable means may be employed for simultaneously starting the oscillation of the photoelectric cell and initiating operation of the recorder, timer or counter. Manual control of the operation of the recorder and movement of the photoelectric cell may be employed, but, in the interests of accuracy, it is advisable to employ an electric circuit. Thus, a motor operated drum could be employed in a circuit which would be completed through the throwing of a switch by the photoelectric cell or its supporting rod at the instant the photoelectric cell commenced its travel over the face of the screen, or a relay actuated in the same manner could be employed for throwing a clutch to engage the recorder or timer with a constantly running motor.

The flashlight 50 is preferably of the type which can be arranged to provide either a pencil type beam or a larger beam, to simulate rifle shooting conditions or shotgun shooting conditions.

The apparatus illustrated is adapted to function to control the operations of the recording device whenever the photoelectric cells and light beams coincide after the triggers are pulled. The apparatus may, therefore, be employed merely to indicate the time required by a subject to make the photoelectric cell and light beam coincide, in which event the trigger may be maintained in a "pulled" position, or the apparatus may be employed to indicate the time and shooting accuracy as well. When shooting conditions are to be simulated, the trigger should be pulled only when the subject believes that the light beam and the photoelectric cell coincide.

If, in the use of the apparatus illustrated for testing shooting accuracy, the trigger is pulled without the photoelectric cell and the light beam properly coinciding, the recording apparatus will show a continuation of the elapsed time, indicating a "miss". A "miss" by a subject will be apparent to the subject and the operator of the apparatus when the apparatus continues to record elapsed time after the trigger has been pulled. In order that the operator may become aware of the pulling of the trigger in the event of a miss, the gun may be provided with explosive caps or other suitable sound making agencies which may be fired or caused to operate through movement of the trigger.

I claim:

1. Apparatus of the character described comprising a light source under control of an operator to be tested, a light sensitive cell, a time indicating device, an electric circuit, said circuit including said light sensitive cell and also including means to control the operation of the time indicating device to mark the end of the indicating period, said means being operable when light rays from said light source are directed on said light sensitive cell.

2. Apparatus of the character described comprising a light source under control of an operator to be tested, an oscillating light sensitive cell, a time indicating device, an electric circuit, said circuit including said light sensitive cell and also including means for controlling the operation of the time indicating device to mark the end of the indicating period, said means being operable when light rays from said light source are directed on said light sensitive cell.

3. Apparatus of the character described comprising a gun, a light source mounted thereon, a light sensitive cell, a time indicating device, an electric circuit, said circuit including said light sensitive cell and also including means for controlling the operation of the time indicating device to mark the end of the indicating period, said means being operable when light rays from said light source are directed on said light sensitive cell.

4. Apparatus of the character described comprising a gun, a light source thereon, an oscillating light sensitive cell, a time indicating device, an electric circuit, said circuit including said light sensitive cell and also including means for controlling the operation of the time indicating device to mark the end of the indicating period, said means being operable when light rays from said light source are directed on said light sensitive cell.

5. Apparatus of the character described comprising a gun, a light source mounted thereon, a light sensitive cell, a time indicating device, an electric circuit, said circuit including said light sensitive cell, also including means for stopping said time indicating device, and a switch mounted on the gun whereby rays of light from said light source must be directed on said cell and said switch actuated to close said circuit and stop said time indicating device.

GEORGE A. FOISY.